United States Patent
Kishida

(10) Patent No.: US 10,873,281 B2
(45) Date of Patent: Dec. 22, 2020

(54) MOTOR CONTROLLER AND MOTOR CONTROL METHOD

(71) Applicant: Nidec Corporation, Kyoto (JP)

(72) Inventor: Hideo Kishida, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 110 days.

(21) Appl. No.: 16/293,874

(22) Filed: Mar. 6, 2019

(65) Prior Publication Data

US 2019/0288618 A1 Sep. 19, 2019

(30) Foreign Application Priority Data

Mar. 14, 2018 (JP) .................................. 2018-046641

(51) Int. Cl.
*H02P 6/17* (2016.01)
*H02P 6/08* (2016.01)
*H02P 6/34* (2016.01)
*H02K 11/215* (2016.01)

(52) U.S. Cl.
CPC .............. *H02P 6/17* (2016.02); *H02K 11/215* (2016.01); *H02P 6/08* (2013.01); *H02P 6/34* (2016.02)

(58) Field of Classification Search
CPC .. H02P 6/182; H02P 6/08; H02P 6/181; H02P 6/34; H02P 6/17; H02K 11/215
See application file for complete search history.

(56) References Cited

U.S. PATENT DOCUMENTS

| | | | | |
|---|---|---|---|---|
| 6,396,229 B1 * | 5/2002 | Sakamoto | ................ | H02P 6/18 |
| | | | | 318/400.02 |
| 6,580,235 B2 * | 6/2003 | Laurent | ................... | H02P 6/085 |
| | | | | 318/400.1 |
| 6,650,073 B2 * | 11/2003 | Kawabata | ................ | H02P 6/08 |
| | | | | 318/400.14 |
| 7,710,064 B2 | 5/2010 | Sakurai et al. | | |
| 9,413,277 B2 * | 8/2016 | Sato | .......................... | H02P 6/06 |
| 2019/0097556 A1 * | 3/2019 | Pramod | ................... | H02P 7/285 |

* cited by examiner

*Primary Examiner* — Thai T Dinh
(74) *Attorney, Agent, or Firm* — Keating & Bennett

(57) ABSTRACT

A motor controller is configured or programmed to include a rotational speed acquirer to acquire an actual rotational speed of a motor including a rotor that includes permanent magnets, a commanded voltage calculator to calculate a commanded voltage to be supplied to the motor based on a difference between the actual rotational speed and a target rotational speed, and a feed-forward compensator to compensate the commanded voltage by an amount equal to an induced voltage in the motor based on the target rotational speed. The feed-forward compensator includes a compensation value calculator to calculate a feed-forward compensation value on which smoothing processing has been performed and an adder to add the feed-forward compensation value to the commanded voltage.

11 Claims, 9 Drawing Sheets

MOTOR CONTROLLER AND MOTOR CONTROL METHOD

CROSS REFERENCE TO RELATED APPLICATIONS

This application claims the benefit of priority to Japanese Patent Application No. 2018-046641 filed on Mar. 14, 2018. The entire contents of this application are hereby incorporated herein by reference.

BACKGROUND OF THE INVENTION

1. Field of the Invention

The present disclosure relates to a motor controller and a motor control method.

2. Description of the Related Art

A simple control method is desirable to use a more inexpensive microcomputer in which motor control programs are incorporated by reducing a computation load on the microcomputer.

In conventional motor driving control, a circuit structure is relatively simple. Motor efficiency can also be increased. As one of inexpensive motor driving control methods, a 120-degree conduction method is often used.

When a 120-degree conduction method is used for speed control, a motor model is handled as being equivalent to a DC motor model and is considered as a single speed system composed of only a speed control loop without current control being performed.

In conventional motor driving control, however, when a speed control gain is designed, the generation of an induced voltage (Back_EMF) is ignored. That is, the influence of the induced voltage on the induced voltage is not considered. This is problematic in that speed responsivity is lowered.

If a speed control gain is increased to improve speed responsivity, however, the amount of manipulation indicates a rapid reaction in response to a rotational speed command, in which case an overcurrent may be caused.

SUMMARY OF THE INVENTION

An example embodiment in the present disclosure is a motor controller that is configured or programmed to include a rotational speed acquirer to acquire an actual rotational speed of a motor that includes a rotor including permanent magnets, a commanded voltage calculator to calculate a commanded voltage to be supplied to the motor based on a difference between the actual rotational speed and a target rotational speed, and a feed-forward compensator to compensate the commanded voltage by an amount equal to an induced voltage in the motor, according to the target rotational speed. The feed-forward compensator includes a compensation value calculator to calculate a feed-forward compensation value on which smoothing processing has been performed and also includes an adder to add the feed-forward compensation value to the commanded voltage.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Example embodiments of the present disclosure will be described below with reference to the drawings.

The range of the present disclosure is not limited to the example embodiments below but can be arbitrarily modified within the technical concept of the present disclosure.

Figure 1:
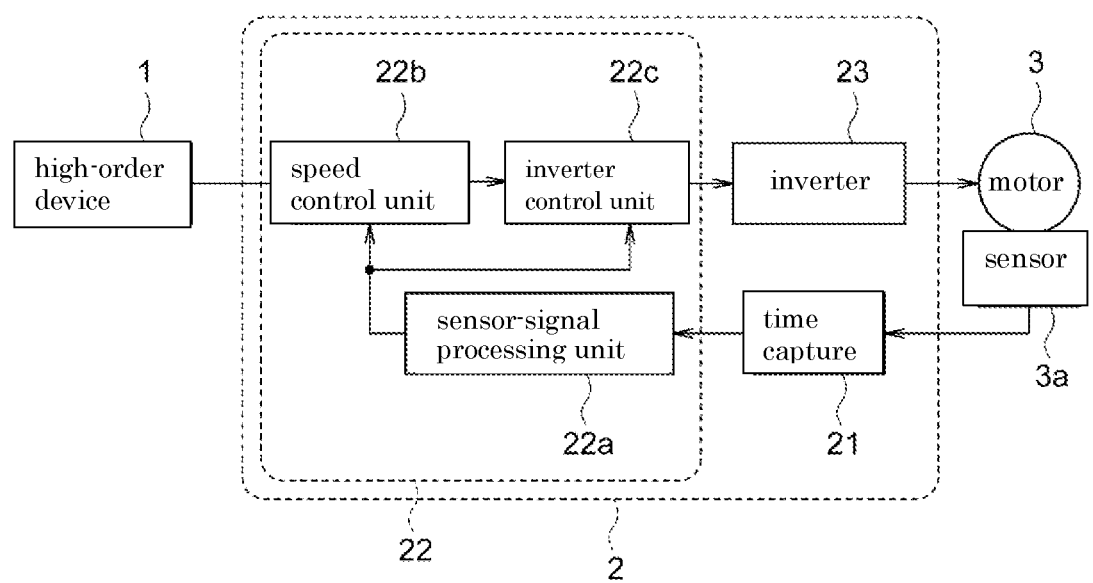
FIG. 1 specifically illustrates the structure of a motor driving system according to an example embodiment of the present disclosure.

FIG. 1 specifically illustrates the structure of a motor driving system 10 in the present example embodiment.

The motor driving system 10 has a high-order device 1, a motor driving device 2, and a motor 3.

The high-order device 1 creates a high-order command value related to the operation of the motor 3 and sends the created high-order command value to the motor driving device 2. The high-order command value is a command value related to the target rotational speed of the motor 3. This embodiment will be described, assuming that a command value related to the target rotational speed is a number-of-revolutions command. However, a command value related to the target rotational speed may be a rotational speed command.

The motor driving device 2 receives a number-of-revolutions command, which is a high-order command value, from the high-order device 1 and controls the speed of the motor 3 in response to the received number-of-revolutions command. The motor driving device 2 is mounted on a circuit board (not illustrated). The circuit board supplies driving electric power to the motor 3.

The motor driving device 2 has a time capture 21, a microcomputer 22, and an inverter 23. The microcomputer 22 is a controller, which includes software, for the motor 3. The microcomputer 22 has a sensor signal processing unit 22a, a speed control unit 22b, and an inverter control unit 22c.

The motor 3 is a three-phase brushless DC motor (BLDC motor). The motor 3 receives electric power from the motor driving device 2. However, the motor 3 is not limited to a BLDC motor. The motor 3 may be any motor that has a rotor in which permanent magnets are used and that generates an electromotive force (induced voltage) when the rotor is rotated. For example, the motor 3 may be a permanent magnet synchronous motor.

A sensor 3a, which acquires rotational position about the motor 3, is attached to the motor 3. In the description of this embodiment, the sensor 3a will be assumed to be a Hall sensor.

The time capture 21 acquires a Hall sensor signal from the sensor 3a and outputs the Hall sensor signal to the sensor signal processing unit 22a in the microcomputer 22. The sensor signal processing unit 22a is a rotational speed acquiring unit that detects the actual rotational speed (actual number of revolutions) of the motor 3 from the Hall sensor signal acquired by the time capture 21. Since, in this embodiment, a high-order command value is a number-of-revolutions command, the sensor signal processing unit 22a detects the actual number of revolutions of the motor 3 from the Hall sensor signal and outputs the actual number of revolutions to the speed control unit 22b.

The speed control unit 22b computes a command voltage to be supplied to the motor 3, according to the difference between the actual number of revolutions of the motor 3 and its target number of revolutions. The inverter control unit 22c creates a pulse-width modulation (PWM) signal according to the command voltage and outputs the PWM signal to the inverter 23.

The inverter 23, which has a gate driver and an inverter, controls the on/off operations of switching elements included in the inverter according to the PWM signal created by the inverter control unit 22c, and supplies driving electric power to the motor 3.

In this embodiment, the inverter control unit 22c controls the driving of the inverter by a 120-degree conduction method, in which the conduction period of each switching element is 120 degrees.

Figure 2:
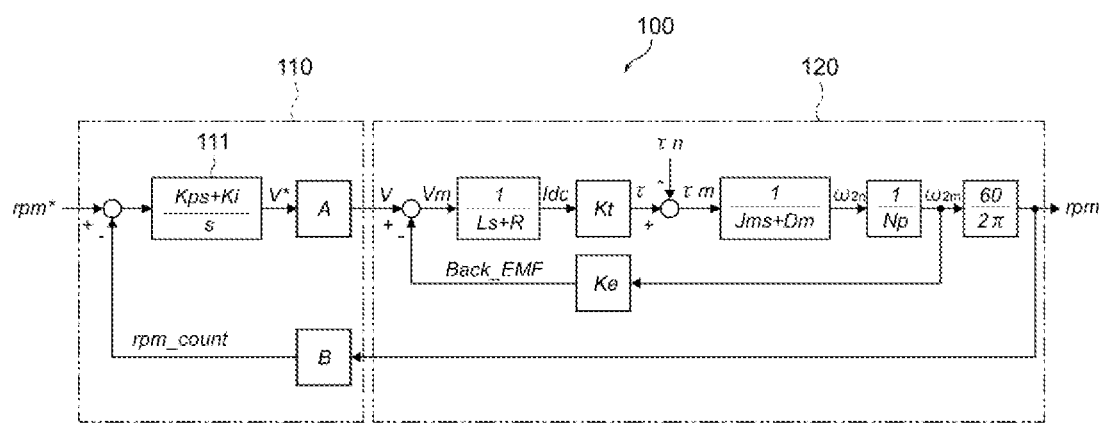
FIG. 2 illustrates a conventional speed control model.

When a controller typified by a microcomputer is used to control the driving of a BLDC motor in a 120-degree conduction method and to control the rotational speed of the BLDC motor to a desired value through speed control, a speed control model 100 as illustrated in FIG. 2 has been considered.

As illustrated in FIG. 2, the speed control model 100 has a microcomputer model 110, in which a PI speed control unit 111 is included, and a motor model 120. In FIG. 2, Kp is the proportional gain of the PI speed control unit 111, Ki is its integral gain, L is the winding inductance of the motor, R is its winding resistance, Jm is moment of inertia, Dm is a viscous friction coefficient, Kt is a torque constant, and Ke is an induced voltage constant. Also, A is a proportionality constant between a commanded voltage V* and an actual voltage V supplied to the motor, and B is a proportionality constant between the actual number of revolutions rpm of the motor and the number of revolutions rpm_count recognized by the microcomputer.

When the speed of the BLDC motor is controlled by 120-degree conduction driving as illustrated in FIG. 2, the motor model 120 is handled as being equivalent to a DC motor model, so the motor model 120 becomes a single speed system composed of only a speed control loop without current control being performed. As a speed control unit, the general PI speed control unit 111 is used. In the design of speed control gains (Kp and Ki), electric responses are ignored assuming that responses of the speed control system are designed so as to be adequately smaller than the electric responses of the motor. At a gain design stage, speed control gains are designed on the basis of a load torque (τn), which becomes a disturbance in the control system, and a transmission function from an input (command) to an output with an induced voltage (Back_EMF) ignored.

Figure 3:
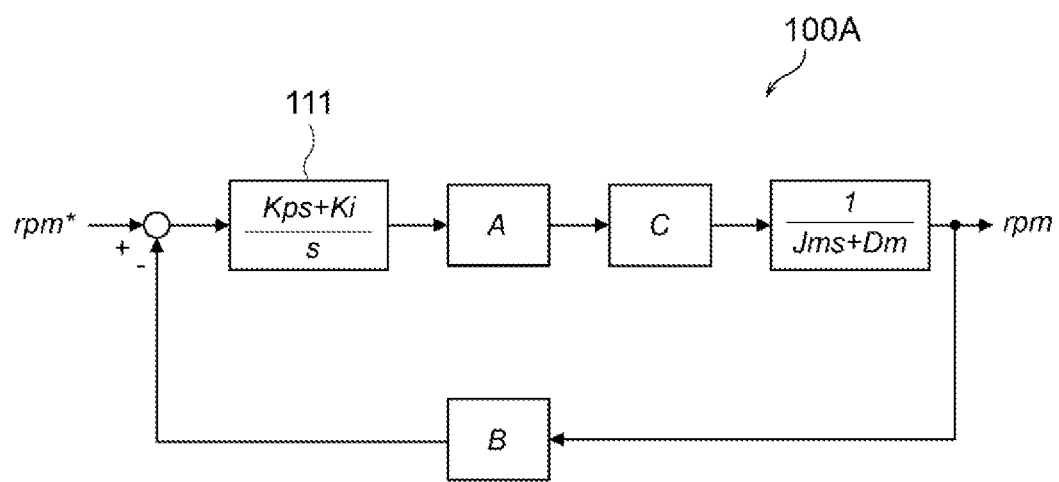
FIG. 3 illustrates a gain design model for a PI speed control unit.

FIG. 3 illustrates a design model 100A for speed control gains.

The design model 100A in FIG. 3 is an approximate model of the speed control model 100 illustrated in FIG. 2. C in FIG. 3 represents a conversion proportionality constant from a voltage input to a torque output, the proportionality constant being obtained by ignoring a primary delay component, in the motor model 120 in FIG. 2, for a current response and compiling other proportionality constants.

As described above, in the selection of the proportional gain Kp and integral gain Ki of the PI speed control unit 111, the induced voltage generated in the motor is ignored. However, this is problematic in that speed responsivity is lowered due to the influence of the induced voltage generated in the motor.

Figure 4:
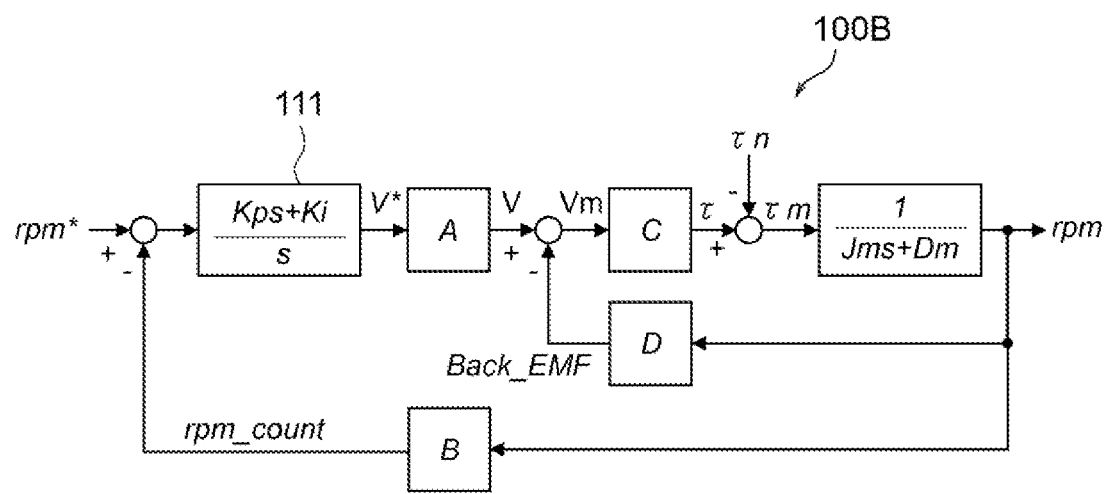
FIG. 4 illustrates a model that indicates the influence of an induced voltage.

FIG. 4 illustrates a model 100B in which the influence of a disturbance is applied to the design model 100A in FIG. 3.

D in FIG. 4 represents a proportionality constant converted from the number of revolutions rpm to an induced voltage Back_EMF.

From FIG. 4, it is found that the induced voltage Back_EMF functions as a disturbance so that a commanded voltage V, which is the amount of manipulation, is cancelled out. Since the induced voltage is a signal proportional to the rotational speed of the motor, as the rotational speed (number of revolutions) of the motor is increased, the induced voltage is also increased and largely functions as a disturbance.

If the induced voltage is ignored at the gain design stage as described above, the influence of the induced voltage on the commanded voltage V, which is the amount of manipulation, is not considered. Therefore, if a number-of-revolutions command rpm*, for example, is rapidly increased, the commanded voltage V is cancelled out by the induced voltage Back_EMF, making it impossible for the actual number of revolutions rpm to rapidly follow the number-of-revolutions command rpm*. As a result, speed responsivity is lowered.

In this embodiment, therefore, to improve the speed responsivity of a BLDC motor, the amount of manipulation is created with the influence of an induced voltage taken into consideration.

Figure 5:
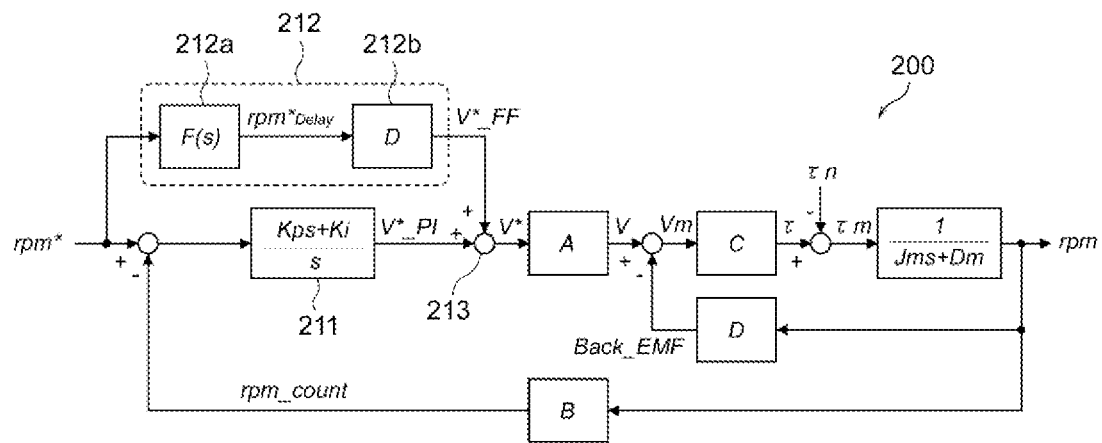
FIG. 5 illustrates a speed control model according to an example embodiment of the present disclosure.

Specifically, as illustrated in FIG. 5, a feed-forward compensator (FF compensator) 212 and an adding unit 213 are provided as a feed-forward compensating unit, besides a PI speed control unit 211. The PI speed control unit 211 is a commanded voltage computing unit that computes a commanded voltage V*_PI according to the difference between the actual number of revolutions rpm of the motor 3 and the number-of-revolutions command rpm*. The speed control gains Kp and Ki of the PI speed control unit 211 are assumed to have been designed by the design model 100A illustrated in FIG. 3.

The feed-forward compensating unit, which composed of the FF compensator 212 and adding unit 213, compensates the commanded voltage V*_PI according to the number-of-revolutions command rpm* by an amount equal to the induced voltage Back_EMF generated in the motor 3.

The FF compensator 212 is a compensation value computing unit that computes a feed-forward compensation value (FF compensation value) V*_FF equivalent to the induced voltage Back_EMF generated in the motor 3. Here, the FF compensator 212 computes a feed-forward compensation value (FF compensation value) V*_FF, on which smoothing processing has been performed. The adding unit 213 adds the FF compensation value V*_FF to the commanded voltage V*_PI to perform feed-forward compensation for the commanded voltage V*_PI so as to cancel out the influence of the induced voltage Back_EMF, after which the adding unit 213 outputs the commanded voltage V* obtained as a result of compensation.

The FF compensator 212 has a smoothing processing unit 212a that performs smoothing processing on the number-of-revolutions command rpm*, and also has a gain multiplying unit 212b that multiplies a number-of-revolutions command rpm*$_{Delay}$, on which smoothing processing has been performed, by a compensation gain D to compute an FF compensation value V*_FF.

The smoothing processing unit 212a performs smoothing processing represented by a transfer function F(s) on the number-of-revolutions command rpm*. The smoothing processing may be moving average processing, low-pass filter processing, or the like. In any type of processing, a smoothing level can be easily adjusted with a simple structure.

As described above, the gain multiplying unit 212b multiplies the number-of-revolutions command rpm*$_{Delay}$, on which smoothing processing has been performed, by the compensation gain D to compute the FF compensation value V*_FF.

Under feed-back control, control is performed so that the actual number of revolutions rpm finally reaches the number-of-revolutions command rpm*. Since the induced voltage Back_EMF is a signal proportional to the actual number of revolutions rpm as described above, it is possible to compute the induced voltage Back_EMF generated in the motor 3 according to the number-of-revolutions command rpm*.

That is, to compensate the commanded voltage V*_PI by an amount equal to the induced voltage Back_EMF generated in the motor 3, it suffices to calculate the induced voltage Back_EMF according to the number-of-revolutions command rpm* and adds the induced voltage Back_EMF to the commanded voltage V*_PI as the amount of manipulation. Thus, it is possible to cancel out the influence of the induced voltage Back_EMF and thereby improve speed responsivity.

That is, the compensation gain D can take a value corresponding to the induced voltage constant Ke of the motor 3 as indicated by the equation below.

Since the value of the induced voltage constant Ke is equivalent to the value of the torque constant Kt, the compensation gain D can also take a value that uses the torque constant Kt.

$$D = Kt \times (2\pi/60) \quad (5)$$

When the driving of the BLDC motor is controlled by a 120-degree conduction method, single speed control (current controlless) is performed. Therefore, if only speed responsivity is improved by the gain multiplying unit 212b, an overcurrent may be generated due to a rapid change in voltage (amount of manipulation). When this type of overcurrent is generated, a failure may be caused in the inverter 23 or motor 3. In this embodiment, therefore, to suppress an overcurrent that may be generated due to current controlless described above, a smoothing processing unit 212a that suppresses a rapid change in the amount of manipulation is provided in front of the gain multiplying unit 212b.

When the smoothing processing unit 212a is provided, even if the number-of-revolutions command rpm*, for example, changes in a step form, the FF compensation value V*_FF output from the gain multiplying unit 212b does not change in a step form but changes gradually. Therefore, even if the umber-of-revolutions command rpm* changes rapidly, it is possible to restrain the commanded voltage V*, obtained as a result of compensation, from changing rapidly and thereby to restrain an overcurrent from being generated.

If the effect of the smoothing processing is enhanced, however, although the generation of an overcurrent can be suppressed, the effect of improving responsivity is reduced. It is preferable for a smoothing level to be appropriately designed by the designer while maintaining consistency with the system.

Thus, in this embodiment, when the motor 3, which is a BLDC motor, is driven under easy control and by a 120-degree conduction method, which can be inexpensively implemented, the amount of manipulation in single speed control is determined in consideration of the influence of an induced voltage generated in the motor 3. Specifically, the amount of manipulation (commanded voltage V*_PI) computed by the PI speed control unit 211 undergoes feed-forward compensation according to the number-of-revolutions command rpm* by an amount equal to the induced voltage Back_EMF. At this time, to suppress a rapid change in the amount of manipulation (commanded voltage V*) obtained as a result of compensation, feed-forward compensation is performed by using the FF compensation value V*_FF on which smoothing processing has been performed. This makes it possible to appropriately suppress an overcurrent that may be generated due to current controlless and to improve speed responsivity.

The effect of this embodiment will be described blow by using examples.

In BLDC motor speed control by 120-degree conduction driving, the speed control model 100 was created as illustrated in FIG. 2, a PI speed control gain was designed according to the design model 100A in FIG. 3, and the motor 3 was actually driven. The number-of-revolutions command rpm* was changed in a step form under no load from 1000 rpm to 2000 rpm. During this change, speed responsivity and a generated current were checked.

Figure 6:
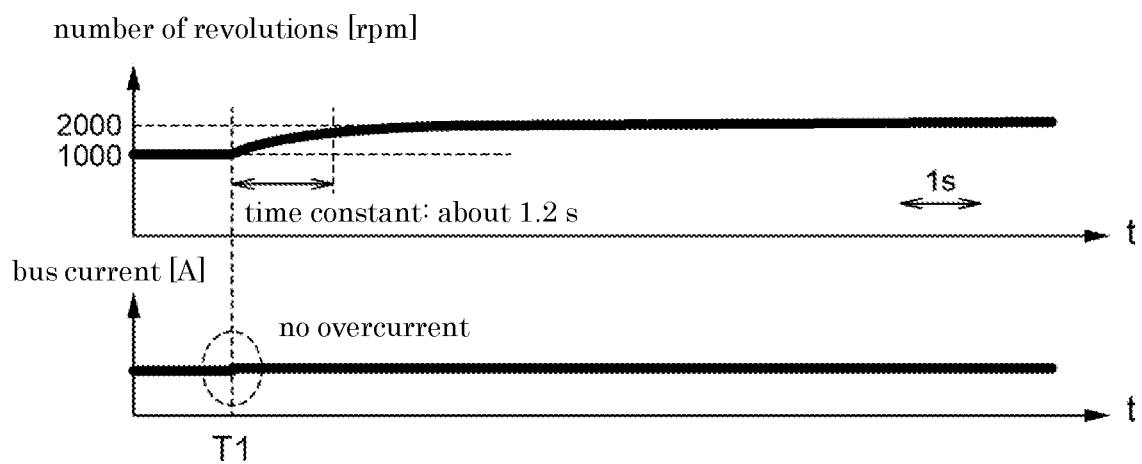
FIG. 6 illustrates speed responsivity and a generated current in a first comparative example.

FIG. 6 illustrates results in a case in which only PI control was performed, as a first comparative example. In this comparative example, a time constant, which is an index in speed responsivity, was 1.2 s. The time constant was a time from when the number-of-revolutions command rpm* was given until the actual number of revolutions rpm reached a target value of 60%. In this comparative example, even when the number-of-revolutions command rpm* was changed in a step form, an overcurrent was not generated.

Figure 7:
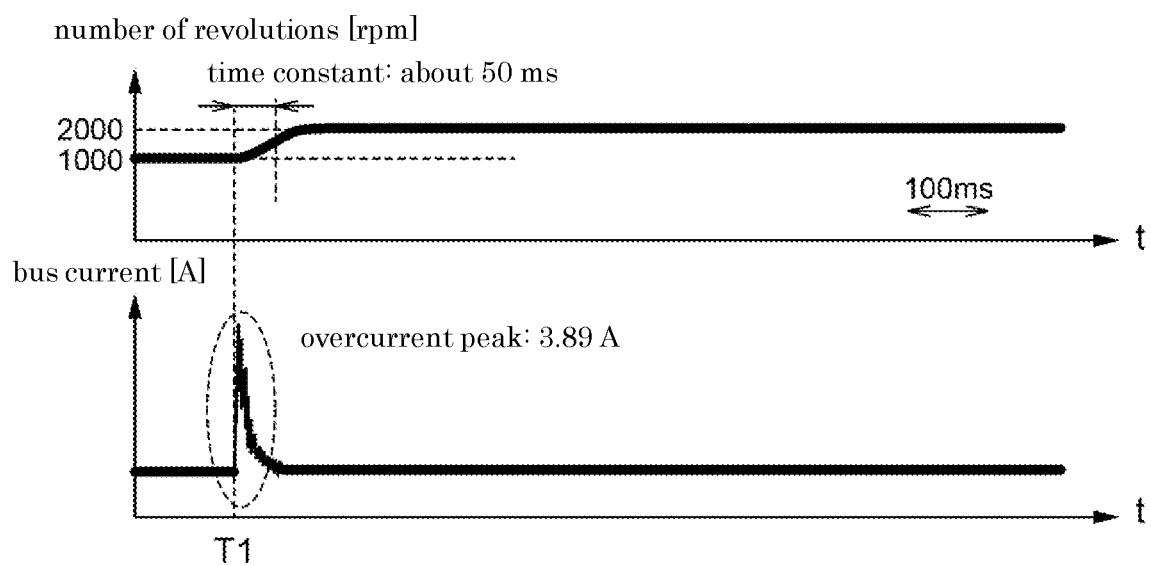
FIG. 7 illustrates speed responsivity and a generated current in a second comparative example.

FIG. 7 illustrates results in a case in which PI control and FF compensation were performed, as a second comparative example. From FIG. 7, it is found that the time constant in speed response was improved to 50 ms due to the effect of FF compensation in which the amount of manipulation was compensated by an amount equal to the induced voltage Back_EMF. However, an overcurrent having an overcurrent peak value of 3.89 A flowed at the moment when the number-of-revolutions command rpm* was changed in a step form.

Figure 8:
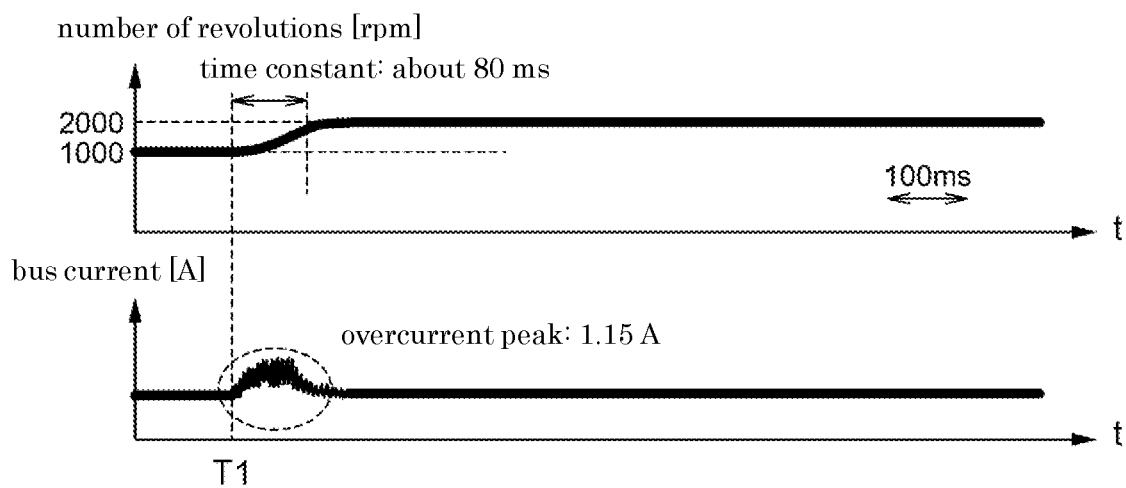
FIG. 8 illustrates speed responsivity and a generated current in an example, in which the number of moving averages is 32.
Figure 9:
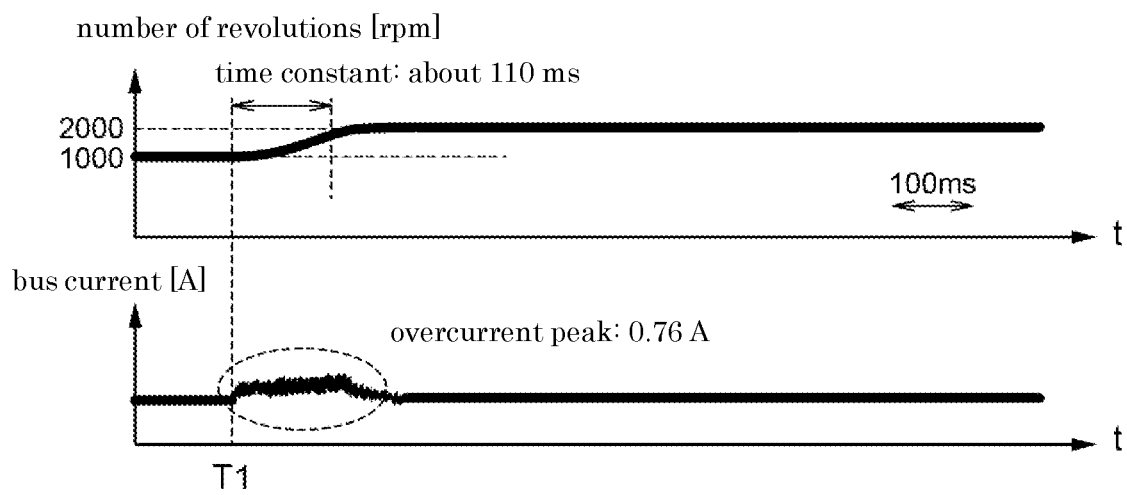
FIG. 9 illustrates speed responsivity and a generated current in another example, in which the number of moving averages is 64.

In contrast to this, as examples, FIGS. 8 and 9 illustrate results in a case in which PI control, FF compensation, and smoothing processing were performed with the FF compensator 212, which has the smoothing processing unit 212a and gain multiplying unit 212b incorporated as illustrated in FIG. 5. In these examples, simple moving average processing that can be easily implemented was performed as smoothing processing. FIG. 8 illustrates results obtained when the number of simple moving averages was 32. FIG. 9 illustrates results obtained when the number of simple moving averages was 64.

From FIGS. 8 and 9, it is found that since the smoothing processing unit 212a was incorporated into the FF compensator 212, the overcurrent seen in FIG. 7 was suppressed. It is also found that the more the number of moving averages was, the more the overcurrent was suppressed (the overcurrent peak value was reduced from 3.89 A to 1.15 A and was further reduced to 0.76 A). By contrast, it is also found that the more the number of moving averages was, the more speed responsivity was lowered (the time constant was increased from 50 ms to 80 ms and was further increased to 110 ms). When compared with the results in FIG. 6, however, it can be said that speed responsivity was significantly improved. That is, it can be confirmed that both improvement in speed responsivity and suppression of the generation of an overcurrent were achieved.

As described above, a method of controlling the motor 3 in this embodiment includes a step of acquiring the actual number of rotations (actual rotational speed) of the motor 3, a step of computing a commanded voltage to be supplied to the motor 3 according to the difference between the actual number of rotations (actual rotational speed) of the motor 3 and a target number of rotations (target rotational speed), and a step of performing feed-forward compensation on the commanded voltage by an amount equal to an induced voltage generated in the motor 3 according to the target number of rotations (target rotational speed). The step of performing feed-forward compensation includes a step of computing an FF compensation value on which smoothing processing has been performed and a step of adding the FF compensation value to the commanded voltage.

Thus, in single speed control in the 120-degree conduction driving of a BLDC motor, it becomes possible for the actual rotational speed of the motor to rapidly follow the target rotational speed and to achieve stable operation. Accordingly, it is possible to improve speed responsivity, suppress the generation of an overcurrent, and reduce costs.

This embodiment is preferable for applications that require high speed responsivity, as typified by a refrigerator. A refrigerator is required to have high speed responsivity because the number of rotations of an electric compressor needs to follow a number-of-revolutions command immediately to perform refrigeration and cooling quickly.

Variations

In the above embodiment, a case in which the smoothing processing unit 212a is placed in front of the gain multiplying unit 212b as illustrated in FIG. 5 has been described. However, the smoothing processing unit 212a may be placed behind the gain multiplying unit 212b. In this placement as well, the FF compensator 212 can compute the smoothed FF compensation value V*_FF. To prevent a drop in the performance of the PI speed control unit 211, the smoothing processing unit 212a is placed between the adding unit 213 and a position at which the FF compensation value V*_FF is smoothed, that is, a terminal into which the number-of-revolutions command rpm* is input.

A case has also been described in which the sensor 3a is a Hall sensor and the actual rotational speed (actual number of revolutions) of the motor 3 is detected from a Hall sensor signal. However, the motor driving system 10 may be a Hall sensor-less system. In this case, the induced voltage Back_EMF generated in the motor 3 is read to acquire the actual rotational speed (actual number of revolutions) of the motor 3, instead of acquiring it from a Hall sensor. Specifically, the induced voltage Back_EMF is acquired from the motion of a current generated in the motor 3 and the actual rotational speed (actual number of revolutions) of the motor 3 is inferred from the induced voltage Back_EMF.

In Hall sensor-less control, costs can be reduced. Even if it is difficult to install a sensor because requirements for an environment in which to install a motor are severe as in control of a compressor motor, the motor can be appropriately controlled.

In the above embodiment, a case has also been described in which the driving of the inverter is controlled by a 120-degree conduction method. However, a conduction method is not limited to the method described above. A conduction method only needs to be capable of being implemented by an inexpensive microcomputer under easy control. For example, a 150-degree conduction method or 180-degree conduction method can also be used.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor controller comprising:
a rotational speed acquirer to acquire an actual rotational speed of a motor that includes a rotor including a permanent magnet;
a commanded voltage calculator to calculate a commanded voltage to be supplied to the motor based on a difference between the actual rotational speed and a target rotational speed; and
a feed-forward compensator to compensate the commanded voltage by an amount equal to an induced voltage in the motor based on the target rotational speed; wherein
the feed-forward compensator includes:
a compensation value calculator to calculate a feed-forward compensation value on which smoothing processing has been performed; and
an adder to add the feed-forward compensation value to the commanded voltage.

2. The motor controller according to claim 1, wherein the compensation value calculator includes:
a smoothing processor to perform smoothing processing on the target rotational speed; and
a gain multiplier to multiply the target rotational speed on which smoothing processing has been performed by a compensation gain matching an induced voltage constant of the motor to calculate the feed-forward compensation value.

3. The motor controller according to claim 1, wherein the smoothing processing includes moving average processing.

4. The motor controller according to claim 1, wherein the smoothing processing includes low-pass filter processing.

5. The motor controller according to claim 1, wherein the rotational speed acquirer includes a Hall sensor to detect the actual rotational speed of the motor.

6. The motor controller according to claim 1, wherein the rotational speed acquirer acquires the induced voltage in the motor and infers the actual rotational speed of the motor based on the induced voltage.

7. The motor controller according to claim 1, wherein the motor is a brushless DC motor.

8. The motor controller according to claim 1, further comprising an inverter controller to control driving of an inverter by a 120-degree conduction method based on the commanded voltage.

9. A motor driving device comprising:
a controller for the motor according to claim 1; and an inverter to control an on/off operation of a switch included in the inverter based on the commanded voltage.

10. A motor comprising the motor driving device according claim 9 to supply power to the motor.

11. A motor controlling method comprising:

acquiring an actual rotational speed of a motor that includes a rotor including a permanent magnet;

calculating a commanded voltage to be supplied to the motor based on a difference between the actual rotational speed and a target rotational speed; and performing feed-forward compensation on the commanded voltage by an amount equal to an induced voltage in the motor based on the target rotational speed; wherein the performing feed-forward compensation includes:

calculating a feed-forward compensation value on which smoothing processing has been performed; and adding the feed-forward compensation value to the commanded voltage.

\* \* \* \* \*